(12) United States Patent
Lonardi et al.

(10) Patent No.: US 8,034,284 B2
(45) Date of Patent: Oct. 11, 2011

(54) BLEEDER VALVE FOR PRESSURIZED FURNACE

(75) Inventors: Emile Lonardi, Bascharage (LU); Lionel Hausemer, Steinsel (LU); Lutwin Franziskus, Wochern (DE)

(73) Assignee: Paul Wurth S.A., Luxembourg (LU)

( * ) Notice: Subject to any disclaimer, the term of this patent is extended or adjusted under 35 U.S.C. 154(b) by 569 days.

(21) Appl. No.: 12/279,053

(22) PCT Filed: Jan. 26, 2007

(86) PCT No.: PCT/EP2007/050795
§ 371 (c)(1),
(2), (4) Date: Aug. 11, 2008

(87) PCT Pub. No.: WO2007/090747
PCT Pub. Date: Aug. 16, 2007

(65) Prior Publication Data
US 2010/0201051 A1    Aug. 12, 2010

(30) Foreign Application Priority Data

Feb. 9, 2006    (FR) .................................... 06 101482

(51) Int. Cl.
*C21B 7/24*    (2006.01)
(52) U.S. Cl. ......................... 266/174; 266/196; 266/199
(58) Field of Classification Search .................. 266/174, 266/196, 199
See application file for complete search history.

(56) References Cited

U.S. PATENT DOCUMENTS

| | | | |
|---|---|---|---|
| 3,601,357 A | 8/1971 | Legille | |
| 4,158,367 A | 6/1979 | Mailliet et al. | |
| 2010/0201051 A1* | 8/2010 | Lonardi et al. | 266/174 |

FOREIGN PATENT DOCUMENTS

| | | |
|---|---|---|
| GB | 152 949 | 3/1921 |
| JP | 59 197679 | 11/1984 |
| NL | 57 560 | 5/1945 |

OTHER PUBLICATIONS

International Search Report; PCT/EP2007/050795; Jul. 4, 2007.
Tsapko V K et al: "Contct-Surface Geometry of Lock in Blast-Furnace Equalizing Valve" Steel in Translation, Allerton Press, New York, NY, US, vol. 30, No. 2, 2000, pp. 4-7, XP001143762; ISSN: 0967-0912.

* cited by examiner

*Primary Examiner* — Scott Kastler
(74) *Attorney, Agent, or Firm* — Cantor Colburn LLP

(57) ABSTRACT

A shaft furnace bleeder valve for controlling a gas outflow from the interior of a pressurized furnace to the ambient atmosphere through an exhaust conduit is proposed. The bleeder valve comprises a valve seat associated with the exhaust conduit, a movable closure member having a central closure surface and a peripheral sealing surface cooperating with the valve seat, the closure surface comprising a convex surface at least in proximity to the sealing surface. The valve further has an actuating mechanism, which is connected to the closure member for moving the closure member between a closed position on the valve seat and an open position distant from the valve seat. According to the invention, the closure member comprises a recurved deflection portion at the periphery of the peripheral sealing surface, the recurved deflection portion comprising a deflection surface inclined against the convex surface by an angle in the range of 30° to 70° for imparting to a gas outflow passing between the valve seat and the closure member a velocity component which is opposite to the initial opening movement of the closure member.

25 Claims, 4 Drawing Sheets

BLEEDER VALVE FOR PRESSURIZED FURNACE

TECHNICAL FIELD OF THE INVENTION

The invention generally relates to a bleeder valve to be used in a shaft furnace, in particular in a blast furnace, for controlling a gas outflow from the interior of the pressurized shaft furnace to the ambient atmosphere.

BRIEF DISCUSSION OF RELATED ART

A blast furnace normally operates at an operating pressure in the range of 1-3 bar above atmospheric, depending on the furnace design. Bleeder valves, also referred to as pressure relief valves or explosion prevention valves, are commonly installed at the throat of the blast furnace, for controlling a gas outflow from the interior of the pressurized furnace to the ambient atmosphere through an exhaust conduit. They allow pressure reduction in case the pressure inside the furnace exceeds a certain admissible value greater than the operating pressure. They may also be used as shutdown exhaust devices which are employed to ventilate a blast furnace when it is operating at a slow rate.

Such a bleeder valve, as disclosed for example in U.S. Pat. No. 4,158,367, commonly comprises a valve seat associated with an exhaust conduit, a movable closure member having a peripheral sealing surface cooperating with the valve seat, and an actuating mechanism which is connected to the closure member for moving the closure member between a closed position on the valve seat and an open position distant from the valve seat. During normal operation, the furnace throat pressure is continuously monitored and, in case pressure exceeds the admissible value, the bleeder valve is opened in automated and controlled manner by means of its actuating mechanism. In order to ensure operational safety and to avoid critical pressures and the risk of explosion, e.g. in case of a malfunction of the actuating mechanism, the bleeder valve is typically designed as relief valve. To this effect, the actuating mechanism is additionally equipped with a safety contrivance having resilient biasing means for biasing the closure member against the valve seat. The safety contrivance that allows safety opening of the closure member without operation of the actuating mechanism when the pressure inside the furnace exceeds the admissible pressure. In case of failure of the aforementioned controlled opening procedure, the bleeder valve opens solely by action of the lifting force that the pressure exerts onto the closure member against the resiliency of the biasing means.

In the bleeder valve according to U.S. Pat. No. 4,158,367, the closure member has a generally concave central closure surface. Lately, it is however preferred to use a closure member with a generally convex central closure surface, e.g. conical or spherical cap shape, as disclosed in U.S. Pat. No. 3,601,357. A generally convex closure surface is aerodynamically advantageous over a concave surface as regards closing of the valve. In fact, when compared to a concave closure surface as illustrated in U.S. Pat. No. 4,158,367, the convex closure surface will be subjected to reduced resistance during closing of the valve. As will be understood, once the bleeder valve has been opened, unproblematic and rapid closing of the bleeder valve is required in order to avoid excessive pressure loss and resulting detrimental consequences on the production process of the furnace.

For safety reasons, during safety opening of the bleeder valve, a given pressure reduction should be achieved in a given time. The achievable pressure reduction obviously depends on the gas throughput. For a given diameter of the valve, gas throughput depends among others on the opening height, i.e. the distance between the closure member and the valve seat during safety opening. The opening height is determined by the force equilibrium between the lifting force caused by the out-flowing furnace gas and the closing force produced by the resilient biasing means. Due to their aerodynamic configuration, known closure members with a convex shaped closure surface, although preferable as regards facilitated closing, allow only a limited lifting force to be exerted onto the closure member and hence only a limited pressure reduction for a given valve diameter.

BRIEF SUMMARY OF THE INVENTION

Accordingly, the invention provides a shaft furnace bleeder valve that is configured such that an increased lifting force is achieved on its closure member during safety opening.

The invention proposes a shaft furnace bleeder valve for controlling a gas outflow from the interior of a pressurized furnace to the ambient atmosphere through an exhaust conduit, which comprises a valve seat associated with the exhaust conduit, a movable closure member having a central closure surface and a peripheral sealing surface cooperating with the valve seat. It should be noted that the central closure surface, which can be generally or even entirely convex, comprises a convex surface at least in proximity to the sealing surface. An actuating mechanism is connected to the closure member for moving the closure member between a closed position on the valve seat and an open position distant from the valve seat. According to the invention, the closure member comprises a recurved deflection portion at the periphery of the peripheral sealing surface, the recurved deflection portion comprising a deflection surface inclined against the outer convex part of the closure surface by an angle in the range of 30° to 70°. Thereby, the deflection portion imparts to an initial gas outflow passing between the valve seat and the closure member (i.e. at small apertures) a substantial velocity component in the direction opposite to the initial opening movement of the closure member without compromising gas throughput especially at small apertures.

By virtue of the recurved deflection portion, an increased lifting force is transmitted to the closure member by the gas flowing out of the exhaust conduit and along the closure member, for a given valve diameter. Hence, an increased gas throughput can be achieved during safety opening without the need to increase the valve diameter (typically in between 400 and 1000 mm). In other words, a bleeder valve equipped with a recurved deflection portion bordering the closure member achieves an increased pressure reduction compared to a prior art bleeder valve having the same diameter. If required, the bleeder valve according to the invention can be reduced in diameter, i.e. built more compact, and still warrant an increased or at least identical pressure reduction compared to the prior art devices. It will further be appreciated that the recurved deflection portion has no noticeable consequence on the faculty of facilitated closing of a closure member with an at least partially or generally convex central closure surface. As will be appreciated, a deflection surface that is inclined against the outer convex part of the closure surface by an angle in the range of 30° to 70°, preferably 40° to 60°, achieves an optimal result with respect to both lifting force and gas throughput.

Hence, in a preferred embodiment for achieving increased lifting forces, the recurved deflection portion comprises a deflection surface inclined against the generally convex central closure surface or at least against the convex surface proximal to the sealing surface by an angle in the range of 40° to 60°. In order to avoid sharp surface transitions causing turbulences in the gas flow, the recurved deflection portion preferably comprises a transition surface arranged in between the deflection surface and the convex part of the closure surface, the transition surface being substantially horizontal in closed position.

In a preferred embodiment, for achieving increased lifting forces and increased gas throughput for a given opening height, the convex part of the closure surface is substantially conical with an included angle in the range of 120° to 160°. In the latter embodiment it is further preferable that the peripheral sealing surface is made of a hardfacing deposit forming a minor projection (e.g. up to 2 mm) from the substantially conical closure surface and that the valve seat comprises a frusto-conical seat surface that cooperates with the peripheral sealing surface. The sealing surface is inclined against the central axis of the exhaust conduit by half the included angle of the substantially conical closure surface. Thereby a reliable metal-to-metal seal can be achieved. Alternatively, the peripheral sealing surface may be flush with the substantially conical closure surface when the valve seat comprises a frusto-conical seat surface cooperating with the peripheral sealing surface. Although requiring better machining tolerances, this embodiment could provide a conical metal-to-metal seal without the need for build-up welding and subsequent grinding. Also in this embodiment, the sealing surface is inclined against the central axis of the exhaust conduit by half the included angle of the substantially conical closure surface.

Although not necessary, the recurved deflection portion advantageously borders the closure member on the entire circumference of the peripheral sealing surface in order to maximize the lifting force.

Preferably, the valve seat comprises a seat surface cooperating with the peripheral sealing surface of the closure member and the valve seat comprises a soft seal embedded inwards, preferably inmost, in the seat surface. With an inwardly arranged seat surface, and a soft seal at the innermost permitted location, the pressure application surface on the seal is minimized in the bleeder valve.

In order to achieve a relief valve design the actuating mechanism preferably comprises a safety contrivance having resilient biasing means for urging the closure member against the valve seat in the closed position so as to allow safety opening of the closure member, without operation of the actuating mechanism, when the pressure inside the pressurized furnace exceeds an admissible value.

In an advantageous and compact embodiment, the actuating mechanism comprises a support arm pivotable about a first shaft for pivoting the closure member between a closed position on the valve seat and an open position distant from the valve seat; a lever pivotable about a second shaft and having a long arm pivotably connected to the support arm and a short arm pivotably connected to an actuator for pivoting the support arm. Herein the long arm is configured extensible and has spring biasing means for biasing the long arm against extension and thereby resiliently urges the closure member against the valve seat in the closed position.

It will be understood that the bleeder valve according to the invention is particularly suitable for equipping a shaft furnace and in particular a blast furnace.

BRIEF DESCRIPTION OF THE DRAWINGS

Further details and advantages of the present invention will be apparent from the following detailed description of a not limiting embodiment with reference to the attached drawings, wherein.

In these drawings, like parts are identified by like reference numerals throughout.

DETAILED DESCRIPTION OF THE INVENTION

Figure 1:
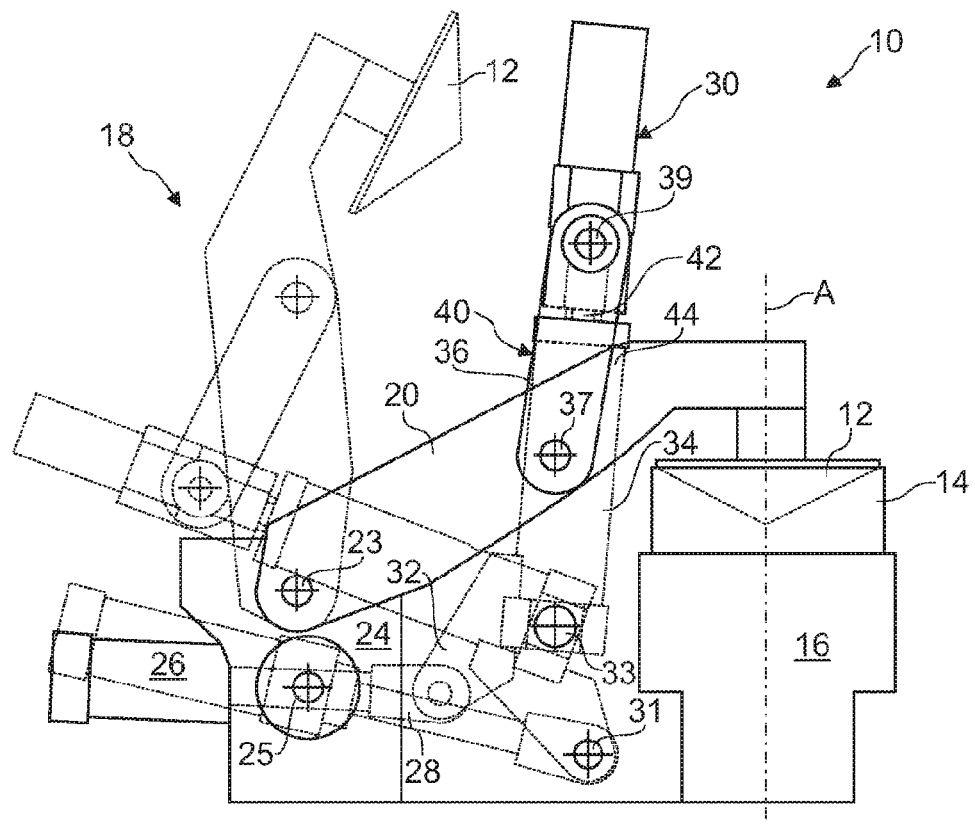
FIG. 1 is a schematic side elevation of a bleeder valve showing an actuation mechanism for moving the valve between a closed position (solid lines) and an open position (broken lines)

FIG. 1 shows a bleeder valve, generally identified by reference numeral 10, as conventionally provided at the throat of a pressurized shaft furnace such as a blast furnace (not shown). The bleeder valve 10 comprises a closure member 12 and a stationary valve seat 14 mounted coaxially on an exhaust conduit 16 having a typical inner diameter of 400 mm to 1000 mm and communicating with the furnace throat. The bleeder valve 10 further comprises an actuating mechanism, generally identified by reference numeral 18, for moving the closure member 12 between a closed position (indicated by solid lines in FIG. 1) and an open position (indicated by broken lines in FIG. 1).

The actuating mechanism 18 comprises a support arm 20 to which the closure member 12 is mounted on a first end by means of a ball-and-socket type joint. The second end of the support arm 20 is pivotably connected to a stationary frame 24 by means of a shaft 23, for pivoting the closure member 12 between the open and the closed position. The actuating mechanism 18 further comprises an actuator 26, e.g. a hydraulic or pneumatic cylinder, which is pivotably connected to the frame 24 at 25 and has its plunger 28 pivotably connected to a bent lever 30, more precisely to the short lever arm 32 of the bent lever 30, at 31. The bent lever 30 is pivotably connected to the stationary frame 24 by means of a shaft 33 in the bent region between its short lever arm 32 and its long lever arm 34. The long lever arm 34 of the lever 30 is connected to the support arm 20 though connecting rods 36. As seen in FIG. 1, both connexions of the connecting rods 36 to the support arm 20 at 37 and to the lever 30 at 39 are pivotable. All pivotable connections 23, 25, 31, 33, 37, 39 have parallel axes of rotation perpendicular to the plane of FIG. 1.

The above construction of the actuating mechanism 18 is known in principle and described in more detail in U.S. Pat. No. 4,158,367. For details about the operation of the actuating mechanism 18, we also refer to the latter document (in particular to the description of FIGS. 9 and 10 in U.S. Pat. No. 4,158,367). As will be appreciated among others, during normal operation, the actuating mechanism allows to open the bleeder valve 10 by pivoting the closure member 12 into a position completely out of the path of gas flowing out of the exhaust conduit 16, i.e. a position distant from the stationary valve seat 14.

Figure 2:
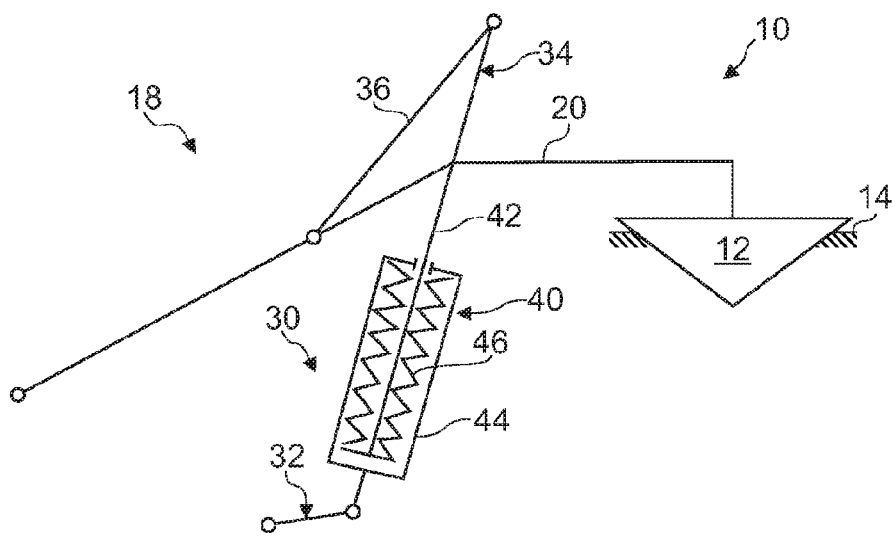
FIG. 2 is a partial schematic view illustrating a safety contrivance which is part of the actuating mechanism shown in FIG. 1.

FIG. 2 quite schematically illustrates the bleeder valve 10 and part of the actuating mechanism 18 in closed position. FIG. 2 furthermore illustrates the configuration of a safety contrivance 40 which is part of the actuating mechanism 18. The safety contrivance 40 has resilient biasing means for resiliently urging the closure member 12 against the valve seat 14. These means are formed by virtue of a spring biased telescoping configuration of the long lever arm 34 of the bent lever 30. To this effect, the long arm 34 is configured extensible and comprises a piston rod 42 and a cylindrical guide 44 relative to which the piston rod 42 is mounted slideable. A compression spring 46 is arranged inside the guide 44 so as to spring bias the piston rod 42 inwards with respect to the guide 44, i.e. so at to contract the long lever arm 34. Due to the linkage configuration of the actuating mechanism 18 in closed position, the compression spring 46 spring biases the closure member 12 against the valve seat 14, as is apparent from FIG. 2. The compression spring 46 may be formed by any suitable means known per se e.g. by a plurality of so called "Belleville washers" arranged inside the guide 44.

Referring to FIG. 1 and FIG. 2, it will be appreciated, that the safety contrivance 40, allows safety opening of the closure member 12 without operation of the actuator 26 in case the pressure in the exhaust conduit 16, i.e. at the furnace throat exceeds the admissible value (setting pressure). When such a setting pressure exerts a force onto the closure member 12 which exceeds the spring biasing force caused by the safety contrivance 40 on the closure member 12, the closure member 12 will lift off the valve seat 14 and produce a safety opening. This is achieved because the support arm 20 can pivot and cause, against the action of the compression spring 46, telescopic extension of the long lever arm 34 through the connecting rods 36. Operation of the actuator 26 is hence not required for safety opening. Accordingly, the compression spring 46 is pre-tensioned to a bias corresponding to the setting pressure, i.e. the maximum admissible pressure at the closure member 12 (taking into account the appropriate lever ratio due to the mechanism 18). Those skilled in the art will also appreciate that the actuating mechanism 18 is designed to be self locking in the closed position of the bleeder valve 10. In fact, from the closed position shown in FIG. 2, the bleeder valve 10 can only be opened by extension of the long lever arm 34 i.e. against the action of the compression spring 46. Hence, the actuator 26 need not be operating to maintain sealing engagement of the closure member 12 on the valve seat 14. The bleeder valve 10 remains closed provided the maximum admissible pressure is not exceeded. It will be understood that the safety contrivance 40 need not necessarily have the configuration described above. Other configurations, e.g. those disclosed in U.S. Pat. No. 4,158,367 and U.S. Pat. No. 3,601,357, are possible as long as safety opening is warranted.

Figure 3:
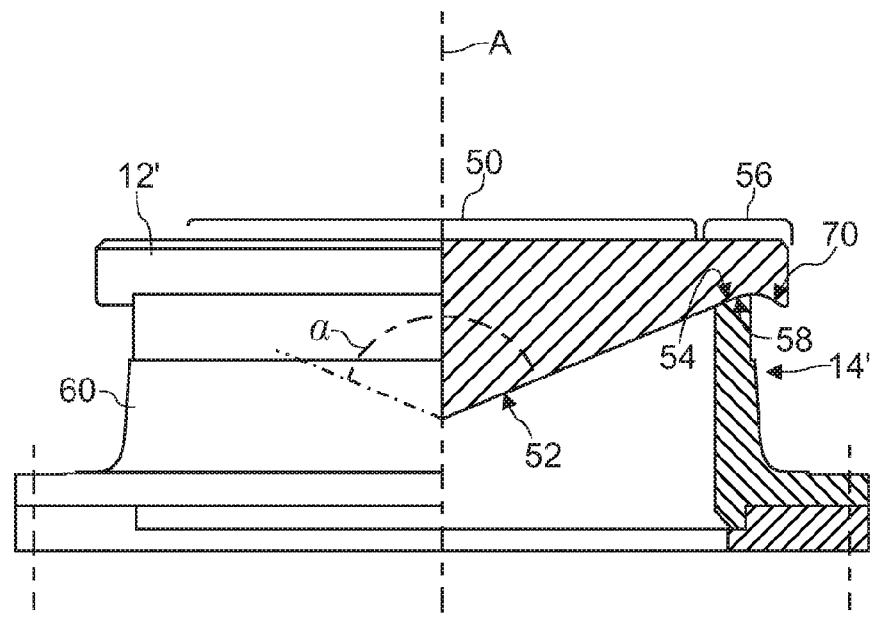
FIG. 3 is a composed view, partially in side elevation and partially in cross-section, showing a valve seat and a closure member for a bleeder valve according to the invention.

FIG. 3 shows a novel closure member 12' for equipping the bleeder valve 10 of FIG. 1. FIG. 3 also shows a modified valve seat 14' designed to cooperate with the novel closure member 12'. The closure member 12' has a central portion 50 with a lower central closure surface 52 that faces the inside of the exhaust conduit 16 when the valve 10 is closed. As will be appreciated from FIG. 3, the central closure surface 52 has a generally convex shape. While it need not be entirely convex, it could for example be flat or concave in its central portion, the central closure surface 52 should be convex at least on the outer portion in proximity to its periphery where a sealing surface (described hereinafter) is provided. In fact, the central closure surface 52 is designed to facilitate and accelerate closing of the valve 10 (e.g. by the actuating mechanism 18 or manually) by allowing rapid movement of the closure member 12' towards the valve seat 14' with comparatively little effort required to overcome the resistance caused by outflowing furnace gas. In other words, the central closure surface 52 in the central portion 50 is designed in the manner of an aerodynamic nose that experiences minimal resistance to rapid motion through the gas during closing movement of the valve 10. It will therefore be understood that the lower surface of the central portion 50 need not be entirely convex. It will also be understood that "generally convex" is intended to cover any shape ensuring the above aerodynamic advantage and therefore includes various possible shapes such as conical, spherical cap or ogive shapes of the central closure surface 52.

In the embodiment shown in FIG. 3, the central closure surface 52 is substantially conical with a rounded tip at the centre. It will be understood that the disc-shaped closure member 12' has the shape of a solid of revolution, i.e. the closure member 12' and the central closure surface 52 present rotational symmetry about central axis A. The included angle $\alpha$ of the right circular cone, according to which the generally convex central closure surface 52 is shaped, is chosen comparatively large, i.e. in the range of 120°-160°, and preferably in the range of 130°-150°.

As seen in FIG. 3, the closure member 12' further comprises a peripheral sealing surface 54 which is located on the lower side of a circumferential outer portion 56 of the closure member 12' and cooperates with a seat surface 58 of the valve seat 14'. The peripheral sealing surface 54 may be formed by a separate insert or integrally with the closure member 12' and is made of suitable material such as a hard metal alloy. In this case, the peripheral sealing surface 54 is flush with the central closure surface 52, i.e. level in the same geometric surface.

In a further embodiment, a hardfacing deposit forms the sealing surface 54. In the latter case, the hardfacing deposit forms a minor protrusion from the conical main surface of the closure member 12', which may protrude by several tenths of a millimeter up to a few millimeters. A hardfacing deposit of sufficient thickness (e.g. 5 mm) can be created by build-up welding onto an appropriate recess provided to this effect in the closure member 12'. The hardfacing deposit is shaped by grinding so as to confer it with a circular cross-section, i.e. a circular arc profile, of large radius (e.g. 500-2000 mm). In case of failure or absence of an additional soft seal (described hereinafter, see FIG. 4), such circular arc profile provides a reliable metal-to-metal joint when the sealing surface 54 rests on the seat surface 58.

The annular sealing surface 54 is inclined against the vertical (which coincides with axis A when the bleeder valve 10 is closed) by half the included angle $\alpha$ of the cone defining the central closure surface 52. As further seen in FIG. 3, the valve seat 14' comprises an annular seat flange 60 for mounting the valve seat 14' e.g. onto the exhaust conduit 16.

Figure 4:
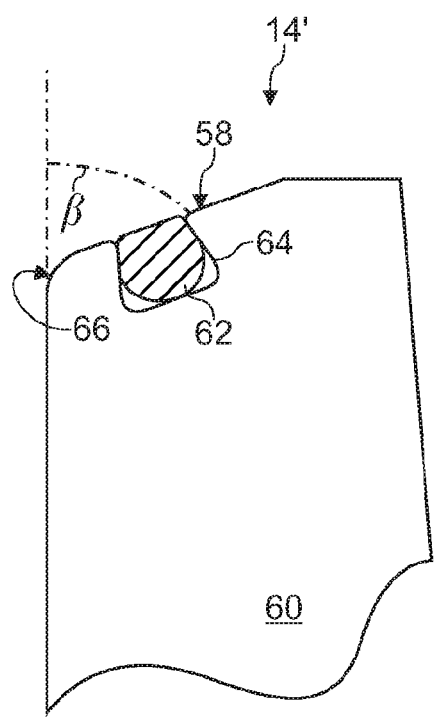
FIG. 4 is an isolated cross-sectional view of the valve seat according to FIG. 3.

FIG. 4 shows the valve seat 14' and in particular the seat surface 58 in more detail. As will be appreciated, the annular seat surface 58 is shaped in conjugated manner with respect to the peripheral sealing surface 54 and hence according to the surface of a frustum of a cone having the same included angle $\alpha$ that defines the central closure surface 52. Accordingly, the seat surface 58 is inclined with respect to the vertical (or axis A when the bleeder valve 10 is closed) by an angle β which equals α/2 in the range of 60-80°, preferably 65°-75°. As further seen in FIG. 4, the valve seat 14' comprises an additional soft seal 62, e.g. an annular o-ring seal made of heat resistant jointing material, arranged in a dovetail groove 64. It will be appreciate that the soft seal 62 is embedded inmost in the seat surface 58, i.e. at the innermost possible radial location. Furthermore, the seat surface 58 is arranged on the inside of the seat flange 60 as appears from FIG. 4. Thereby, the pressure application surface (inside the exhaust conduit 16) at the seat surface 58 and especially at the soft seal 62 is minimized. FIG. 4 also shows a rounded inner edge 66 of the valve seat 14'.

Figure 5:
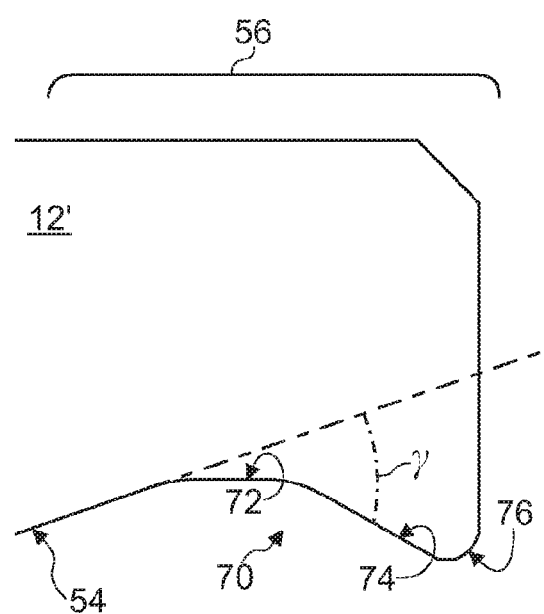
FIG. 5 is an isolated cross-sectional view showing a recurved deflection surface of the closure member according to FIG. 3.

As further seen in FIG. 3 and in more detail in FIG. 5, the novel closure member 12' comprises a recurved deflection portion 70 that is bent back or curved down against the initial flow direction of gas exiting the exhaust conduit 16 (see FIG. 1). The recurved deflection portion 70 is arranged at the periphery of the sealing surface 54, i.e. radially outside of the sealing surface 54 in the outer portion 56 of the closure member 12'. In other words, the part of the outer portion 56 that protrudes radially beyond the peripheral sealing surface 54 and forms the recurved deflection portion 70. As will be appreciated, the recurved deflection portion 70 is shaped so as to impart to a gas outflow passing between the valve seat 14' and the closure member 12' (i.e. during safety opening) a velocity component which is opposite to the initial opening movement of the closure member 12'. The latter aspect will become more apparent from the description of FIG. 6 below. As seen in FIG. 5, the recurved deflection portion 70 comprises two major surfaces, an inner inclined transition surface 72 and an outer inclined deflection surface 74. The transition surface 72 that is inclined against the central closure surface 52 (and the sealing surface 54) so as to be substantially perpendicular to axis A, i.e. horizontal in closed position, contributes to a comparatively smooth surface transition between the closure surface 52 (and the sealing surface 54) and the deflection surface 74. The deflection surface 74 of the recurved deflection portion 70 is inclined against the closure surface 52 by an angle γ in the range of 30° to 70° but preferably 40° to 60°. It will be understood that although preferred, the recurved deflection portion 70 need not necessarily border the closure member 12' on the entire circumference. As further seen in FIG. 5, the outer portion 56 further comprises a rounded outer edge 76 peripherally adjacent the recurved deflection portion 70. In addition, the transitions between the surfaces 54, 72, 74 are rounded i.e. devoid of sharp edges.

Figure 6:
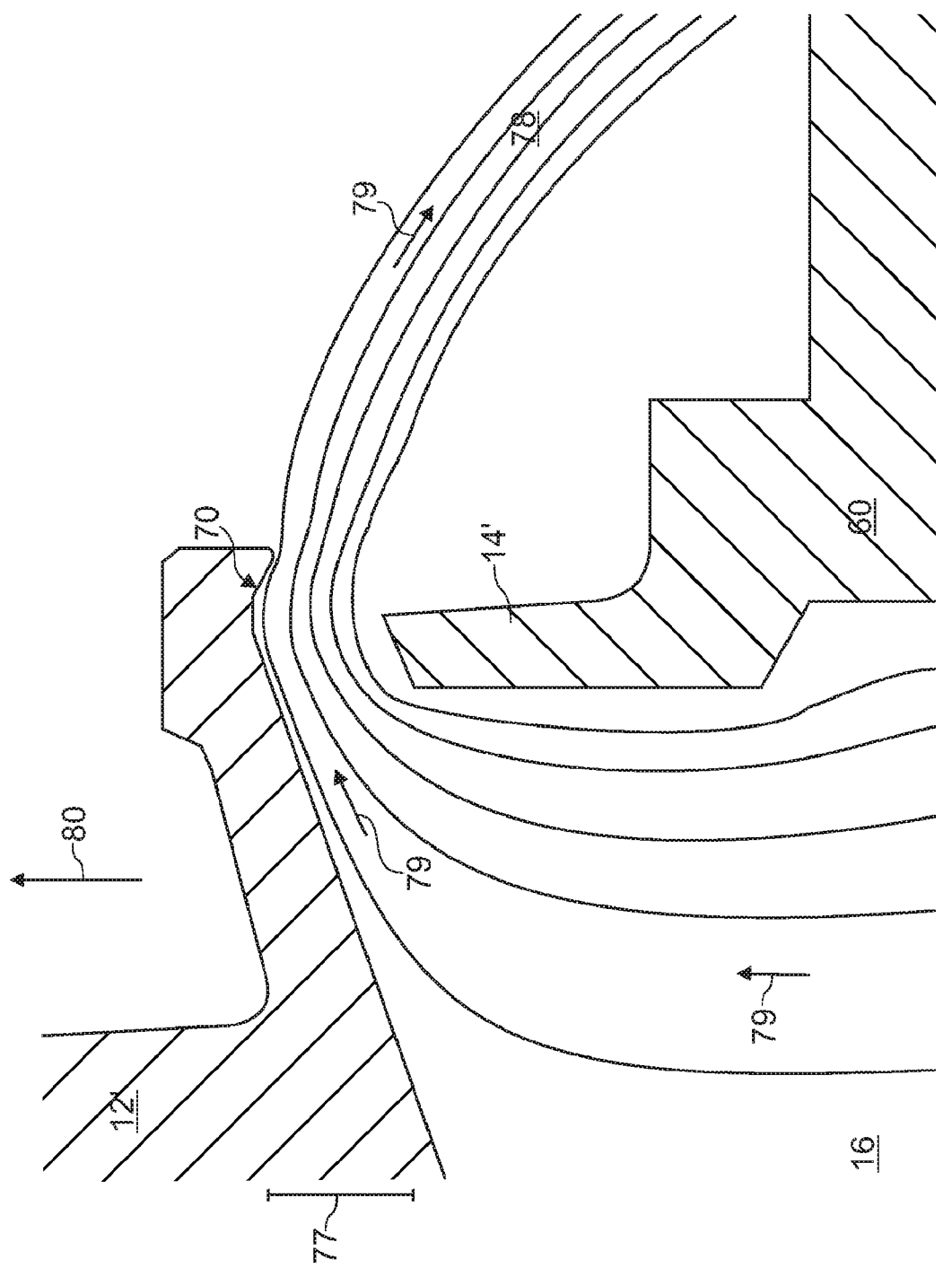
FIG. 6 is a partial cross-sectional view showing the bleeder valve according to the invention and illustrating gas flow streamlines during safety opening.

FIG. 6 illustrates the function of the recurved deflection portion 70 on the novel closure member 12'. FIG. 6 shows a streamline simulation of a gas outflow passing between the novel closure member 12' and the valve seat 14' during safety opening. During safety opening, the opening height (lift-off height) of the closure member 12' above the valve seat 14', indicated at 77, is normally in the range of several centimeters. As illustrated by streamlines 78 in FIG. 6, the gas outflow, indicated by arrows 79, follows a curved path which is initially directed upwards, in parallel with the exhaust conduit 16, and subsequently side-wards and partially downwards. As will be appreciated, this is achieved by virtue of the recurved deflection portion 70 that imparts a velocity component to the gas outflow 79 which is opposite the initial opening movement of the closure member 12' and hence opposite to the initial gas flow direction in the exhaust conduit 16. Thereby, an increased total lifting force, indicated by arrow 80, is exerted by the gas outflow onto the closure member 12', when compared to a closure member known from prior art bleeder valves having the same diameter. Hence an increased opening height 77 (for a given spring biasing force exerted by the compression spring 46) is achieved. Increased opening height 77 results in increased gas throughput and, consequently, increased pressure reduction over time during safety opening. Furthermore, for a given required pressure reduction over time, the closure member 12', and consequently, the valve seat 14' may have a reduced diameter compared to a prior art bleeder valve.

With respect to FIG. 6, it may be noted that the streamlines 78 have been obtained by numerical finite-element calculations for the presented closure member 12' and valve seat 14' at a given pressure. The outer portion 56 of the closure member 12', including the recurved deflection portion 70 (with its surface portion 72 and deflection surface 74 and the rounded outer edge 76) as well as the valve seat 14', e.g. with angle β and rounded edge 66, are shaped so as to minimize turbulences in the gas outflow 79. As will also be appreciated, the respective angles α, β, γ are furthermore chosen to maximize the throughput that is achievable at a given opening height 77 (see FIG. 8).

Figure 7:
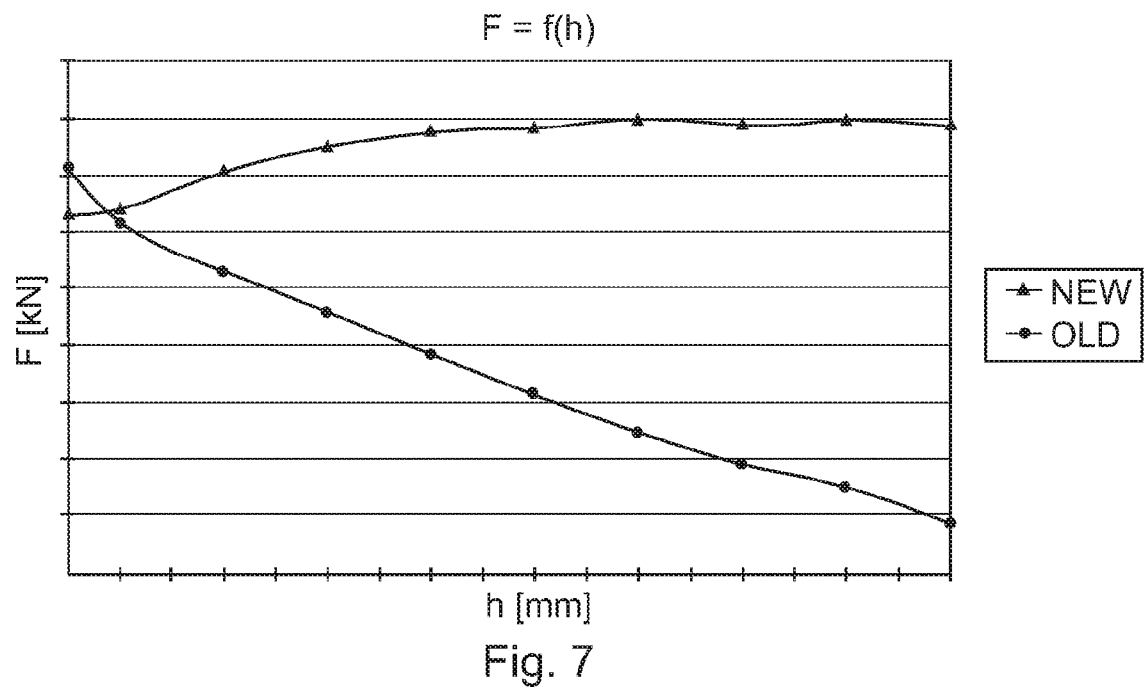
FIG. 7 is a graph of lifting force in function of safety opening height for comparing the lifting forces exerted onto the closure member according to the invention and the lifting forces exerted onto a prior art closure member.

A further advantage of the novel closure member 12' with the recurved deflection portion 70 will become apparent from FIG. 7. FIG. 7 is a graph of lifting force F (see 80 in FIG. 6) in function of safety opening height h (see 77 in FIG. 6) for comparing the lifting forces F exerted onto a novel closure member (see 12' in FIGS. 3-6) with those exerted onto a prior art closure member (see 12 in FIGS. 1-2) of identical sealing diameter but devoid of recurved deflection portion 70. The curve plotted for the novel closure member 12' is marked with triangles, whereas the curve plotted for the known closure member 12 is marked with circles. From FIG. 7 it is apparent, that with the novel closure member 12', the obtained lifting force F (see 80 in FIG. 6) is an increasing function of opening height h (see 77 in FIG. 6) over a much longer interval of opening height h than with the known closure member 12. Since the spring biasing force caused by the safety contrivance 40 is substantially proportional to the opening height h, the achieved opening height h (77 in FIG. 6) during safety opening will be significantly greater with the novel closure member 12' (for a given compression spring 46).

Figure 8:
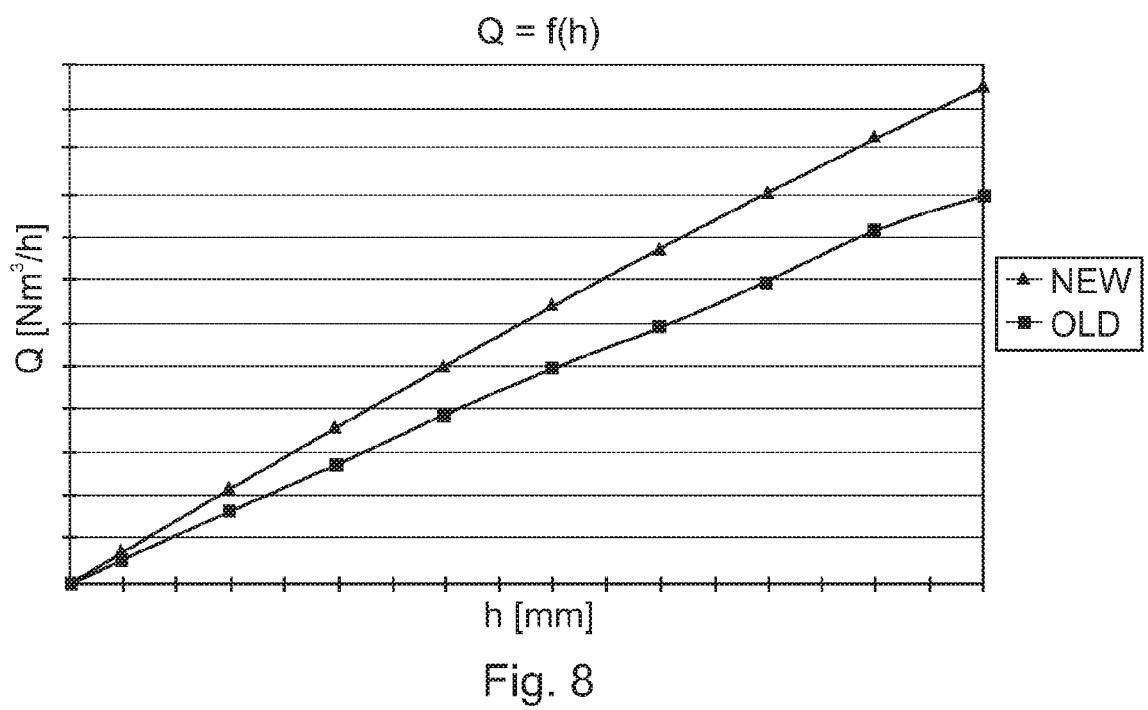
FIG. 8 is a graph of flow rate in function of safety opening height for comparing the flow rates achieved with the closure member according to the invention and the flow rates achieved with a prior art closure member at a given opening height.

FIG. 8 is a graph of flow rate Q (gas throughput) in function of safety opening height h for comparing the flow rates Q achieved with a novel closure member (see 12' in FIGS. 3-6) with those achieved with a known closure member (see 12 in FIGS. 1-2) of identical sealing diameter but devoid of deflection surface. The curve plotted for the novel closure member 12' is marked with triangles, whereas the curve plotted for the known closure member 12 is marked with squares. In addition to the increase in flow rate Q obtained by increasing the opening height h during safety opening, it is apparent from FIG. 8 that an additional increase in flow rate is achieved for any given same opening height h by virtue of the increased included angle α (and seat angle β) and by virtue of the excellent isentropic efficiency of the novel closure member 12' and bleeder valve 14'. As will be understood, a further increase may be achieved by increasing the valve diameter. It may be noted that both graphs of FIG. 7 and FIG. 8 have been obtained numerically by means of finite element simulations. It will be understood, that an optimal design of the recurved deflection portion 70 depends on the design of the central closure surface 52 itself. Hence, a different design of the recurved deflection surface may be required when using a different design of convex central closure surface (e.g. spherical cap shaped).

Finally it remains to be noted, that existing bleeder valves can relatively simply be retrofitted with the novel closure member 12' and the corresponding valve seat 14' without requiring modifications or replacement of the other existing parts of the bleeder valve 10.

The invention claimed is:

1. A bleeder valve for controlling a gas outflow from the interior of a pressurized furnace to the ambient atmosphere through an exhaust conduit, comprising:
   a valve seat associated with an exhaust conduit;
   a movable closure member having a central closure surface and a peripheral sealing surface cooperating with said valve seat, said closure surface comprising a convex surface at least in proximity to said sealing surface; and
   an actuating mechanism which is connected to said closure member for moving said closure member between a closed position on said valve seat and an open position distant from said valve seat;
   wherein said closure member comprises a recurved deflection portion at the periphery of said peripheral sealing surface, said recurved deflection portion comprising a deflection surface inclined against a tangent to said convex surface at the periphery of said convex surface by an angle in the range of 30° to 70° for imparting to a gas outflow passing between said valve seat and said closure member a velocity component which is opposite to the initial opening movement of said closure member.

2. The bleeder valve as claimed in claim 1, wherein said recurved deflection portion comprises a deflection surface inclined against said convex surface by an angle in the range of 40° to 60°.

3. The bleeder valve as claimed in claim 2, wherein said recurved deflection portion comprises a transition surface arranged in between said deflection surface and said convex surface, said transition surface being horizontal in closed position.

4. The bleeder valve as claimed in claim 3, wherein said convex surface is conical with an included angle in the range of 120° to 160°.

5. The bleeder valve as claimed in claim 4, wherein said peripheral sealing surface is made of a hardfacing deposit forming a projection from said conical surface, and said valve seat comprises a frusto-conical seat surface that cooperates with said peripheral sealing surface and that is inclined against the central axis of said exhaust conduit by half the included angle of said conical surface.

6. The bleeder valve as claimed in claim 4, wherein said peripheral sealing surface is flush with said conical surface, and said valve seat comprises a frusto-conical seat surface that cooperates with said peripheral sealing surface and that is inclined against the central axis of said exhaust conduit by half the included angle of said conical surface.

7. The bleeder valve as claimed in claim 1, wherein said recurved deflection portion borders said closure member on the entire circumference of said peripheral sealing surface.

8. The bleeder valve as claimed in claim 1, wherein said valve seat comprises a seat surface cooperating with said peripheral sealing surface of said closure member and said valve seat comprises a soft seal embedded inwards in said seat surface.

9. The bleeder valve as claimed in claim l, wherein said closure member is dimensioned for sealing a conduit having an inner diameter of 400-1000 mm.

10. The bleeder valve as claimed in claim 1, wherein said actuating mechanism comprises a safety contrivance having resilient biasing means for urging said closure member against said valve seat in said closed position and for allowing safety opening of said closure member when the pressure inside said pressurized furnace exceeds an admissible value.

11. The bleeder valve as claimed in claim 10, wherein said actuating mechanism comprises:
    a support arm pivotable about a first shaft for pivoting said closure member between a closed position on said valve seat and an open position distant from said valve seat;
    a lever pivotable about a second shaft and having a long arm pivotably connected to said support arm and a short arm pivotably connected to an actuator for pivoting said support arm;
    said long arm being configured extensible and having spring biasing means for biasing said long arm against extension and thereby resiliently urging said closure member against said valve seat in said closed position.

12. A bleeder valve comprising:
    a valve seat associated with a conduit;
    a movable closure member having a central closure surface and a peripheral sealing surface cooperating with said valve seat, said closure surface comprising a convex surface at least in proximity to said sealing surface;
    a mechanism that comprises a safety contrivance having resilient biasing means for urging said closure member against said valve seat and for allowing safety opening of said closure member when the pressure inside said conduit exceeds an admissible value;
    said closure member further comprising a recurved deflection portion that is arranged at the periphery of said peripheral sealing surface and that comprises a deflection surface which is inclined against a tangent to said convex surface at the periphery of said convex surface by an angle in the range of 30° to 70° for imparting to a gas outflow passing between said valve seat and said closure member a velocity component opposite to the safety opening movement of said closure member.

13. The bleeder valve as claimed in claim 12, wherein said recurved deflection portion comprises a deflection surface inclined against said convex surface by an angle in the range of 40° to 60°.

14. The bleeder valve according to claim 12, wherein said closure member is dimensioned for sealing a conduit having an inner diameter of 400-1000 mm.

15. A shaft furnace, in particular a blast furnace, comprising a bleeder valve for controlling a gas outflow from the interior of said furnace to the ambient atmosphere through an exhaust conduit, said bleeder valve comprising:
    a valve seat associated with an exhaust conduit on said furnace;
    a movable closure member having a central closure surface and a peripheral sealing surface cooperating with said valve seat, said closure surface comprising a convex surface at least in proximity to said sealing surface;
    said closure member comprising a recurved deflection portion arranged at the periphery of said peripheral sealing surface, said recurved deflection portion comprising a deflection surface that is inclined against a tangent to said convex surface at the periphery of said convex surface by an angle in the range of 30° to 70° so as to impart to a gas outflow passing between said valve seat and said closure member a velocity component which is opposite to the initial opening movement of said closure member.

16. The furnace as claimed in claim 15, wherein said recurved deflection portion comprises a deflection surface inclined against said tangent by an angle in the range of 40° to 60°.

17. The furnace as claimed in claim 15, wherein said recurved deflection portion comprises a transition surface arranged in between said deflection surface and said convex surface, said transition surface being horizontal in closed position.

18. The furnace as claimed in claim 15, wherein said convex surface is conical with an included angle in the range of 120° to 160°.

19. The furnace as claimed in claim 18, wherein said peripheral sealing surface is made of a hardfacing deposit forming a projection from said conical surface, and said valve seat comprises a frusto-conical seat surface that cooperates with said peripheral sealing surface and that is inclined against the central axis of said exhaust conduit by half the included angle of said conical surface.

20. The furnace as claimed in claim 18, wherein said peripheral sealing surface is flush with said conical surface, and said valve seat comprises a frusto-conical seat surface that cooperates with said peripheral sealing surface and that is inclined against the central axis of said exhaust conduit by half the included angle of said conical surface.

21. The furnace as claimed in claim 15, wherein said recurved deflection portion borders said closure member on the entire circumference of said peripheral sealing surface.

22. The furnace as claimed in claim 15, wherein said valve seat comprises a seat surface cooperating with said peripheral sealing surface of said closure member and said valve seat comprises a soft seal embedded inwards in said seat surface.

23. The furnace as claimed in 15, wherein said closure member is dimensioned for sealing a conduit having an inner diameter of 400-1000 mm.

24. The furnace as claimed in claim 15, wherein said bleeder valve further comprises an actuating mechanism which is connected to said closure member for moving said closure member between a closed position on said valve seat and an open position distant from said valve seat, said actuating mechanism comprising a safety contrivance having resilient biasing means for urging said closure member against said valve seat in said closed position and for allowing safety opening of said closure member when the pressure inside said pressurized furnace exceeds an admissible value.

25. The furnace as claimed in claim 24, wherein said actuating mechanism comprises:
- a support arm pivotable about a first shaft for pivoting said closure member between a closed position on said valve seat and an open position distant from said valve seat;
- a lever pivotable about a second shaft and having a long arm pivotably connected to said support arm and a short arm pivotably connected to an actuator for pivoting said support arm;
- said long arm being configured extensible and having spring biasing means for biasing said long arm against extension and thereby resiliently urging said closure member against said valve seat in said closed position.

* * * * *

UNITED STATES PATENT AND TRADEMARK OFFICE
CERTIFICATE OF CORRECTION

| | | |
|---|---|---|
| PATENT NO. | : 8,034,284 B2 | Page 1 of 1 |
| APPLICATION NO. | : 12/279053 | |
| DATED | : October 11, 2011 | |
| INVENTOR(S) | : Emile Lonardi et al. | |

It is certified that error appears in the above-identified patent and that said Letters Patent is hereby corrected as shown below:

Title Page

Section (30) Foreign Application Priority Data

Please replace the information printed in Section (30) as follows:

Feb. 9, 2006 (EP) .................................. 06 101482

Signed and Sealed this
Thirty-first Day of January, 2012

David J. Kappos
*Director of the United States Patent and Trademark Office*